United States Patent [19]

Frykhult

[11] 4,334,986
[45] Jun. 15, 1982

[54] SEPARATOR FOR A MIXTURE OF A SUSPENSION AND COARSE HEAVY PARTICLES

[75] Inventor: Rune H. Frykhult, Huddinge, Sweden

[73] Assignee: AB Celleco, Tumba, Sweden

[21] Appl. No.: 238,114

[22] Filed: Feb. 25, 1981

[30] Foreign Application Priority Data

Feb. 25, 1980 [SE] Sweden ............................ 8001440

[51] Int. Cl.³ .............................................. B04C 9/00
[52] U.S. Cl. ....................................... 209/17; 209/211; 209/250; 209/270; 209/273; 210/304
[58] Field of Search ................. 209/211, 144, 17, 250, 209/270, 273; 210/512.1, 512.2, 304

[56] References Cited

U.S. PATENT DOCUMENTS

| | | | |
|---|---|---|---|
| 2,776,053 | 1/1957 | Krebs | 209/211 |
| 3,061,098 | 10/1962 | Brezinski | 209/144 X |
| 3,235,090 | 2/1966 | Bose et al. | 209/211 X |
| 3,288,286 | 11/1966 | Prins et al. | 209/211 |
| 3,399,770 | 9/1968 | Salomon | 209/211 |
| 4,151,083 | 4/1979 | Dove | 209/211 |
| 4,252,640 | 2/1981 | Musselmann | 209/211 X |

Primary Examiner—Ralph J. Hill
Attorney, Agent, or Firm—Cyrus S. Hapgood

[57] ABSTRACT

A separator for separating coarse particles from cellulose pulp suspensions and the like comprises a first separation chamber provided with an inlet for incoming mixture, a first outlet for the light fraction, and an outlet for an intermediate fraction enriched in coarse particles. A second separation chamber is provided with a second inlet, a second outlet for a light return fraction, and an outlet for separated heavy fraction, the outlet for intermediate fraction being connected to the second inlet leading from a first zone in the first separation chamber. Said zone has a higher pressure than a second zone connected to the second outlet, the second zone being located in the first separation chamber or connected to the latter, the first and second separation chambers thus communicating to form a circuit.

18 Claims, 10 Drawing Figures

SEPARATOR FOR A MIXTURE OF A SUSPENSION AND COARSE HEAVY PARTICLES

This invention relates to a separator for separating a mixture into a light fraction consisting of a suspension, such as a cellulose pulp suspension, and a heavy fraction of coarse particles, the separator comprising a first separation chamber having a first inlet for the incoming mixture, a first outlet for the light fraction and an outlet for an intermediate fraction enriched in coarse particles.

The screens of hydrocyclone separators are commonly used for separating suspensions, in the form of coarse, heavy particles like sand, stones, pieces of concrete, fragments of iron, etc. If it is desired to separate the coarse impurities in the form of a continuous so-called reject flow, there is a problem which arises. In order to avoid plugging of the reject outlets by the reject flows, these outlets must be given such a dimension that the largest particles can pass through them freely, which means that the reject outlets have large flow areas. This in turn means that a large part of the valuable material, namely the cellulose fibers and the like, also will flow out through the reject outlets. This circumstance makes it necessary to use screens or hydrocyclone separators coupled in series in a plurality of steps, that is, up to 3-4 steps, in order that the reject flow shall be freed from valuable substance to a level which is acceptable from an economical or environmental point of view.

An alternative solution to the problem of loss of valuable substance with the reject flow is provided by lock devices in connection with the reject outlets, that is, vessels having a valve at the entrance and a valve at the exit. The drawback with such lock devices has been that the vessel is also filled up with valuable substance which prevents some of the coarse impurities from being discharged. This means that the coarse particles remaining in the screen of hydrocyclone separator give rise to wear.

The principal object of the present invention is to provide a separator of the type first mentioned which makes it possible to maintain a continuous reject flow of coarse, heavy particles without giving rise to loss of valuable cellulose pulp suspension or the like, and without the need for any pump for the circulation of flows. A further object is to provide such a separator which is of a simple design, is economical in operation, and functions efficiently.

According to the invention, the separator is characterized by a second separation chamber provided with at least one second inlet and a second outlet for a light return fraction and an outlet for separated heavy fraction, the outlet for the intermediate fraction being connected to the second inlet and leading from a first zone in the first separation chamber, said zone having a higher pressure than a second zone which is connected to the second outlet, the second zone being located in the first separation chamber or at least communicating with the latter, the first and second separation chambers thus communicating to form a circuit.

The second separation chamber can be made rotationally symmetrical and provided with a tangential second inlet and a central second outlet for a light return fraction.

In one suitable embodiment of the invention, the first separation chamber is also rotationally symmetrical and provided with a first tangential inlet and a central first outlet for the light fraction.

At least one of the two separation chambers is preferably designed as a conventional hydrocyclone separator, that is, with a circular cylindrical part and at least one partly conical part. In certain cases it may be suitable to provide the first separation chamber with a first screen means arranged to let the light fraction pass through said screen means, while the coarse particles are prevented from passing through the same.

The second separation chamber can also be provided with a second screen means through which the light return fraction can pass while the heavy fraction (the coarse particles) are prevented from passing through the same.

In both of these cases, the screen means are usually provided in circular cylindrical separation chambers, the screen means also having this form and being arranged coaxial with the symmetry axis of the separation chamber. The screen means may also be rotatably arranged within the separation chamber.

Screen means can be used alternatively in the first separation chamber in the form of a rotationally symmetrical screen mantle which includes a screen chamber connected directly to the first inlet, a stirrer means being provided to rotate along the inside of the screen mantle so that the mixture in the screen chamber is given a movement of rotation. The centrifugal force thus provided facilitates the separation into a light fraction and a heavy fraction.

The first and second zones may be arranged in different ways. It is suitable to arrange the outlet for the intermediate fraction in such a way in the first zone that the energy of movement of the flow is utilized. This is made possible by arranging the axial direction of the outlet tangential in the outer part of the first separation chamber, if the latter is formed as a hydrocyclone separator.

If the second zone is located within the first separation chamber, this is achieved by directing the second outlet away from the direction of flow. If the separation chamber is rotationally symmetrical and is provided with a tangential inlet, a further reduction of the pressure in the second zone is obtained if the second zone is located at a distance from the periphery of the separation chamber, that is, closer to its center.

Alternatively, the second zone can be located in the inlet to the first separation chamber, the inlet preferably being formed like an ejector. In this case the second central outlet is connected to the narrow part of the first inlet, where the pressure is lowest.

In order to provide advantageous flow conditions in said circuit, it is suitable to make the flow area of the outlet for the intermediate fraction larger than the flow area in the second central outlet for light return fraction.

In those cases where the second separation chamber is designed like a hydrocyclone separator, it is suitable to arrange the latter with its axis of symmetry substantially vertical, with the conical part directed downwards, the second separation chamber being designed in such a way, considering the variation of its transverse sectional area with its tangential extension, that the flow rate up through the separation chamber towards the central, second outlet is less than the speed of downward movement of the coarse particles provided by the forced flow through the second inlet in combination with the action of the gravitational force. Thus, the coarse particles are prevented from being drawn with the ascending flow back to the first separation chamber.

Considering the benefit of a compact design and efficient functioning, it is advantageous to combine the first and second separation chambers into one unit divided by a transverse wall and in which the outlet for the intermediate fraction coinciding with the second outlet, and the second outlet for light return fraction in direct contact with the second zone in the first separation chamber, are arranged through said transverse wall.

Considering the risk of the coarse particles adhering on their way towards the outlet for heavy fraction, it is suitable to arrange at least one guide bar in one or both of the separation chambers. This guide bar is arranged circumferentially and follows the flow path of the coarse particles so as to guide said particles toward the outlet for heavy fraction.

In a suitable embodiment of the invention, there is provided in the first separation chamber a guide bar which, in its extension approaching the outlet for intermediate fraction, gradually increases in radial width.

It is suitable to design the outlet for the intermediate fraction from the first separation chamber like a tangential descending channel provided with an axial wall, a guide bar having such a radial width that the axial wall is located radially outside of the inner edge of the guide bar.

In order to keep the outlet for the intermediate fraction free from impurities, it may be suitable to provide it with a spray nozzle through which cleaning liquid can be fed.

The invention will now be disclosed more in detail, reference being made to the accompanying schematic drawings, in which FIGS. 1 and 2 are plan views of two embodiments of a separator according to the invention;

FIGS. 6, 7 and 8 are sectional views along the lines VI—VI, VII—VII and VIII—VIII, respectively, in FIG. 5;

Figure 10:
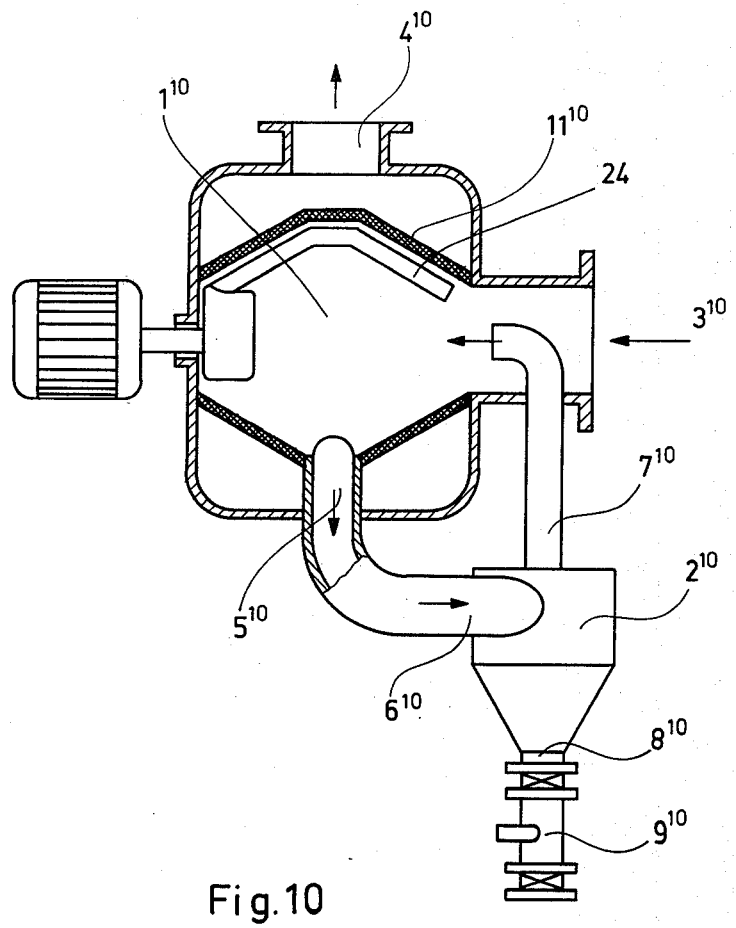

and FIG. 10 is a horizontal sectional view, partly in plan, of an embodiment with screen means and stirrer means.

In the drawings, the following reference numerals designate the following elements:

A first separation chamber 1, $1^1$, $1^2$, $1^3$, $1^4$ and $1^{10}$.
A second separation chamber 2, $2^1$, $2^2$, $2^3$, $2^4$ and $2^{10}$.
A first inlet 3, $3^1$, $3^2$, $3^3$, $3^4$ and $3^{10}$.
A first outlet 4, $4^1$, $4^2$, $4^3$, $4^4$ and $4^{10}$.
An outlet for intermediate fraction 5, $5^1$, $5^2$, $5^3$ and $5^{10}$.
A second inlet 6, $6^1$, $6^2$, $6^3$, $6^4$ and $6^{10}$.
A second outlet 7, $7^1$, $7^2$, $7^3$, $7^4$ and $7^{10}$.
An outlet for heavy fraction 8, $8^1$, $8^2$, $8^3$, $8^4$ and $8^{10}$.
A lock device 9, $9^1$, $9^3$ and $9^{10}$.

Figure 1:
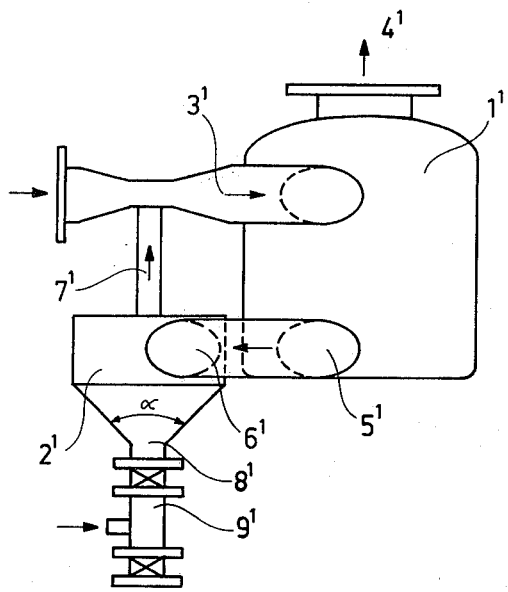

The separator in FIG. 1 has circular cylindrical first and second separation chambers $1^1$ and $2^1$ in the form of conventional hydrocyclone separators provided with a lock device $9^1$. The first inlet $3^1$ is tangential and formed like an ejector to which the second central outlet $7^1$ is connected. A circuit is thus formed in which an intermediate fraction discharges through outlet $5^1$ into the second separation chamber $2^1$, where heavy, coarse particles are collected in lock device $9^1$ while a light return fraction is sucked into the ejector of inlet $3^1$ and returns to first separation chamber $1^1$.

Figure 2:
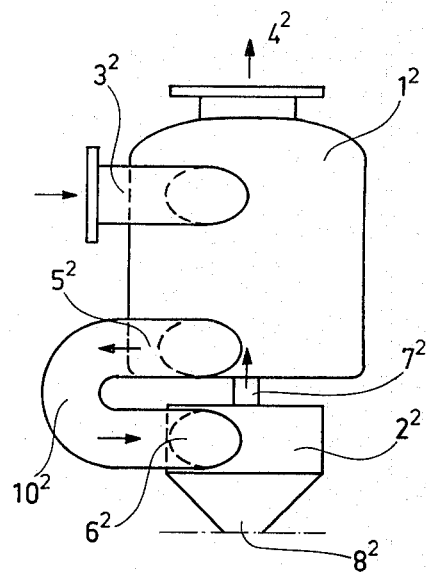

The embodiment of FIG. 2 comprises a line $10^2$ connecting second outlet $5^2$, leading from the peripheral part of first separation chamber $1^2$, with the second inlet $6^2$ of second separation chamber $2^2$. The second central outlet $7^2$ is connected directly to the central lower part of first separation chamber $1^2$.

Figure 3:
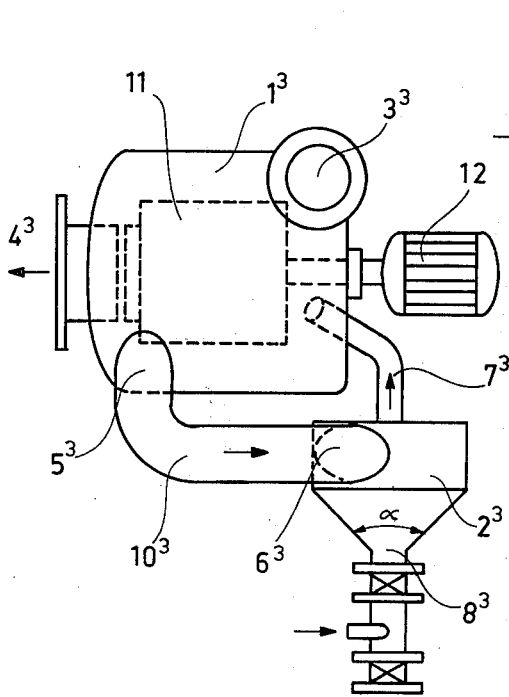
FIGS. 3 and 4 are plan and transverse sectional views, respectively, of two more embodiments provided with a screen means.

The embodiment shown in FIG. 3 comprises a connecting line $10^3$ and a circular cylindrical screen element $11^3$, which is rotatable by a motor 12.

Figure 4:
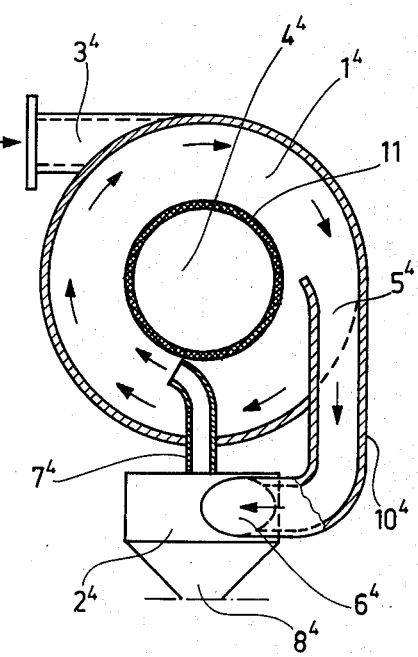

In the separator according to FIG. 4, the outlet $5^4$ for intermediate fraction opens against the flow in the peripheral part of first separation chamber 1 so that the energy of movement of the flow is utilized. The intermediate fraction flows through a connecting line $10^4$ into the second inlet $6^4$ of second separation chamber $2^4$ where heavy, coarse particles are separated and discharged through outlet $8^4$. A light return fraction flows from chamber $2^4$ through second central outlet $7^4$ into the second zone of first separation chamber $1^4$ with the opening directed in the direction of flow outside of a screen means $11^4$, whereby an ejection action is provided. The light fraction is discharged from first separation chamber $1^4$ through first central outlet $4^4$.

The separator in FIG. 10 comprises a screen means $11^{10}$ formed like a rotational symmetrical screen mantle, with an axis of symmetry at 90° to the symmetry axis of first separation chamber $1^{10}$. Inlet $3^{10}$ leads into a screen chamber formed by the screen means, in which chamber a stirrer or so-called "foil" 24 is provided to rotate along the inside of the screen mantle, whereby the mixture in the screen chamber is given a rotational movement. By this movement of rotation, a higher pressure is created at the outlet $5^{10}$ for intermediate fraction than at the second central outlet $7^{10}$, which opens within inlet $3^{10}$ so that a certain ejection action is provided.

In FIGS. 5–9, a compact embodiment of a hydrocyclone separator according to the invention is shown more in detail. First separation chamber 1 comprises a circular cylindrical part 13 and two truncated conical parts 14 and 15. The last of these parts is limited by a plane transverse wall 16, which also forms an upper gable of the second separation chamber 2 consisting of two truncated conical parts 17 and 18. Outlet 5 for intermediate fraction runs directly in the form of a channel through the transverse wall 16 and becomes the second inlet 6. Said channel has an axial limiting wall 19. The second central outlet 7 is formed as a central circular opening in the transverse wall 16. In first separation chamber 1 there are guide bars 20 and 21, and in the second separation chamber 2 there is a guide bar 22.

Figure 6:
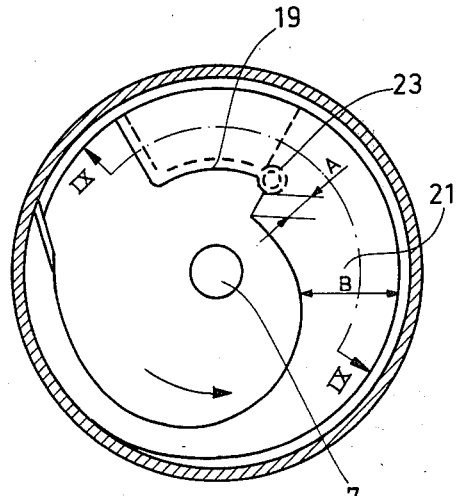
Figure 7:
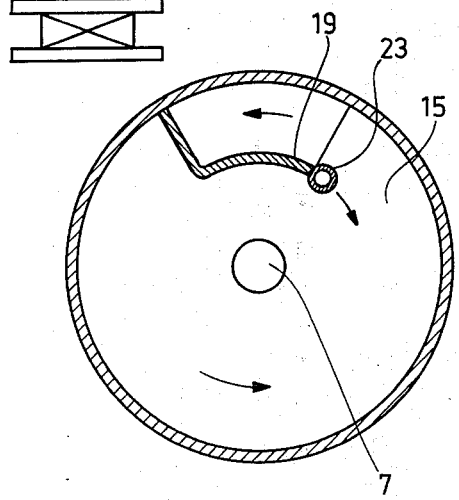

The guide bar 21 grows in radial width as the guide bar approaches the outlet 5 for intermediate fraction, which is apparent from FIG. 6, so that the axial wall 19 lies radially outside the inner edge of the adjacent part of guide bar 21. A spray device 23 is arranged to keep the outlet 5 free from any deposits and coarse particles. The channel forming outlet 5 and inlet 6, and appearing as a sectional view along the line IX—IX in FIG. 6, is developed in FIG. 9.

Figure 5:
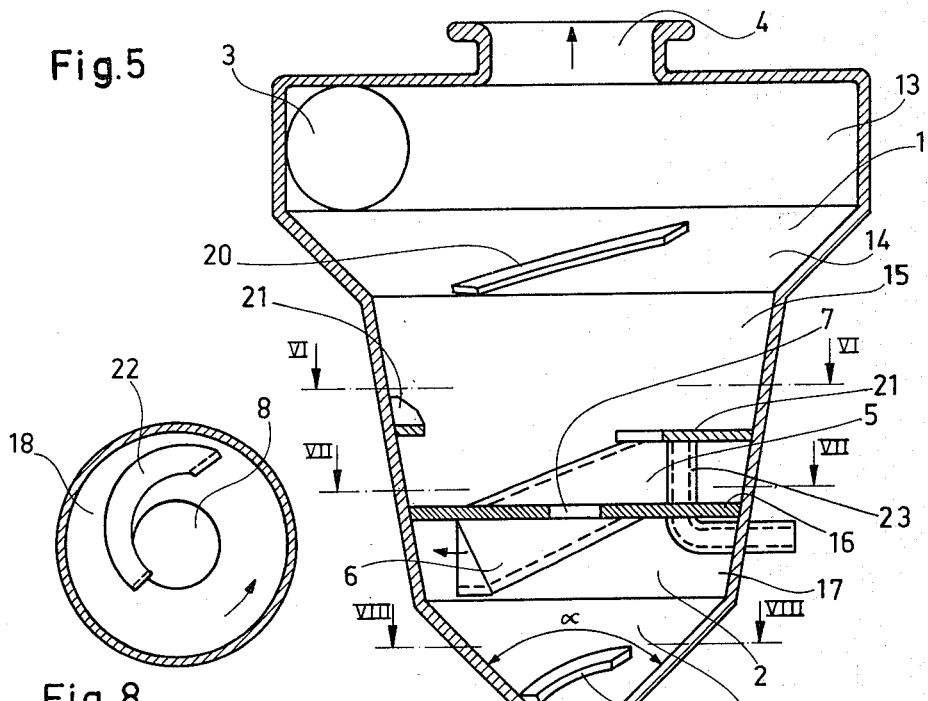
FIG. 5 is a longitudinal sectional view of a compact form of the invention.
Figure 9:
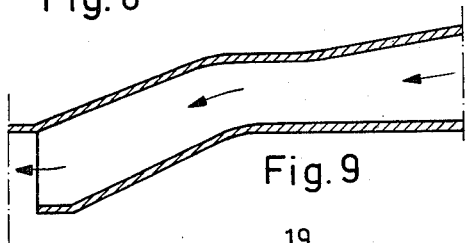
FIG. 9 is a developed sectional view along line IX—IX in FIG. 6.

In the operation of the hydrocyclone separator in FIG. 5, an incoming mixture, such as cellulose pulp and coarse, heavy particles, is fed through tangential inlet 3 and flows in a helical path down towards outlet 5, through which an intermediate fraction containing the coarse particles is discharged tangentially. The major part of the flow, containing cellulose pulp suspensions or the like, is discharged centrally through the first central outlet 4. The intermediate fraction enters chamber 2 tangentially through the second inlet 6 and flows in a helical path down towards the outlet 8 for heavy fraction. The coarse particles separated by the cyclone action in chamber 2, and constituting the heavy fraction, discharge downwardly from outlet 8 into the lock device 9, which can possibly be maintained open continuously, while a light return fraction enters centrally into the first separation chamber 1 through the second central outlet 7. The rate of axial ascending flow through the second separation chamber 2 is lower than the descending speed of the coarse particles, so that there is no risk of such particles being drawn up to the first separation chamber. As shown in FIG. 5, the symmetry axis of the second separation chamber 2 is substantially vertically oriented, and its conical part points downwards.

I claim:

1. A separator for separating a mixture into a light fraction consisting of a suspension, such as a cellulose pulp suspension, and a heavy fraction of coarse particles, the separator comprising means forming a first separation chamber having a first inlet for said mixture, a first outlet for the light fraction, and an outlet for an intermediate fraction enriched in coarse particles, said means also forming a second separation chamber having a second inlet, a second outlet for a light return fraction, and an outlet for separated heavy fraction, said outlet for an intermediate fraction being connected to the second inlet and leading from a first zone in the first separation chamber, said zone having a higher pressure than a second zone connected to the second outlet, said second zone communicating with the first separating chamber, the first and second separating chambers communicating to form a circuit, said second outlet for a light return fraction being located between an inlet region in said second separation chamber and an outlet region in said first separation chamber, the separator including stationary means for maintaining in said inlet region a pressure sufficiently higher than the pressure in said outlet region to induce flow of said light return fraction from said second chamber to said first chamber by way of said second outlet, said inlet region and outlet region being free of any moving part.

2. The separator of claim 1, in which the second separation chamber is rotationally symmetrical, said second inlet being tangential, said second outlet being centrally located in said second chamber.

3. The separator of claim 1, in which said first separation chamber is rotationally symmetrical, said first inlet being tangential, said first outlet being centrally located in said first chamber.

4. The separator of claim 1, in which the second separation chamber has a circular cylindrical part into which said second inlet leads tangentially, said second chamber also having a conical part.

5. The separator of claim 4, in which said second chamber has an axis of symmetry which is substantially vertical, said conical part pointing downwards, said second separation chamber being so formed that the ascending flow rate up through said second chamber toward said second outlet is less than the descending speed of movement of the coarse particles provided by the forced flow through said second inlet in combination with the action of the gravitational force.

6. The separator of claim 1, comprising also screen means located in said first separating chamber and operable to allow said light fraction to pass through the screen means while preventing the coarse particles from passing through the screen means.

7. The separator of claim 6, in which said screen means is a rotationally symmetrical screen mantle forming a screen chamber connected directly to said first inlet and to said outlet for an intermediate fraction, the separator also comprising stirrer means mounted for rotation along the inside of said screen mantle, whereby the mixture in said screen chamber acquires a rotational movement.

8. The separator of claim 1, comprising also a guide bar located in said second separation chamber and operable to guide the flow of coarse particles toward said outlet for separated heavy fraction.

9. The separator of claim 1, in which the first separation chamber has a circular cylindrical part into which said first inlet leads tangentially, said first chamber also having a conical part.

10. The separator of claim 1, in which said outlet for the intermediate fraction is arranged to utilize energy of movement in the first zone.

11. The separator of claim 1, in which said second zone is located within the first separation chamber at a distance from the periphery of said first chamber.

12. The separator of claim 11, in which said second outlet is directed away from the direction of the flow.

13. The separator of claim 1, in which said second zone is located outside the first separation chamber and within said first inlet, said first inlet forming an ejector.

14. The separator of claim 1, in which the flow area of said outlet for the intermediate fraction is larger than the flow area in said second outlet for a light return fraction.

15. A separator for separating a mixture into a light fraction consisting of a suspension, such as a cellulose pulp suspension, and a heavy fraction of coarse particles, the separator comprising means forming a first separation chamber having a first inlet for said mixture, a first outlet for the light fraction, and an outlet for an intermediate fraction enriched in coarse particles, said means also forming a second separation chamber having a second inlet, a second outlet for a light return fraction, and an outlet for separated heavy fraction, said outlet for an intermediate fraction being connected to the second inlet and leading from a first zone in the first separation chamber, said zone having a higher pressure than a second zone connected to the second outlet, said second zone communicating with the first separating chamber, the first and second separating chambers communicating to form a circuit, said chamber-forming means including a transverse wall dividing said first and second chambers from each other, said outlet for the intermediate fraction coinciding with said second inlet and extending through said wall, said second outlet for light return fraction extending through said wall and leading directly to said second zone in the first separation chamber.

16. The separator of claim 15, comprising also a guide bar located in the peripheral part of said first separation chamber and operable to guide the coarse particles toward said outlet for the intermediate fraction.

17. The separator of claim 16, in which said guide bar approaches said outlet for the intermediate fraction with a gradually increasing radial width.

18. The separator of claim 17, comprising also an axial wall located radially outside the inner edge of an adjacent part of said guide bar, said axial wall forming part of said outlet for the intermediate fraction extending through said transverse wall.

* * * * *